(12) United States Patent
Yamaoka

(10) Patent No.: US 9,085,037 B2
(45) Date of Patent: Jul. 21, 2015

(54) WIRE ELECTRICAL DISCHARGE MACHINE AND WIRE ELECTRICAL DISCHARGE METHOD FOR REDUCING MACHINING DAMAGE DURING CUTTING MACHINING AND ESCAPE MACHINING

(71) Applicant: FANUC CORPORATION, Yamanashi (JP)

(72) Inventor: Masahide Yamaoka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 211 days.

(21) Appl. No.: 13/688,478

(22) Filed: Nov. 29, 2012

(65) Prior Publication Data

US 2013/0220979 A1  Aug. 29, 2013

(30) Foreign Application Priority Data

Feb. 27, 2012  (JP) ................. 2012-040461

(51) Int. Cl.
*B23H 7/06* (2006.01)
*B23H 7/20* (2006.01)
*B23H 1/02* (2006.01)
*B23H 9/12* (2006.01)

(52) U.S. Cl.
CPC ............... *B23H 1/02* (2013.01); *B23H 7/065* (2013.01); *B23H 7/20* (2013.01); *B23H 9/12* (2013.01); *G05B 2219/45221* (2013.01)

(58) Field of Classification Search
CPC ........... B23H 1/02; B23H 7/065; B23H 7/06; B23H 7/32; B23H 7/18; B23H 7/20; B23H 9/12; G05B 2219/45221
USPC ................... 219/69.17, 69.12, 69.16, 69.19; 700/162
See application file for complete search history.

(56) References Cited

U.S. PATENT DOCUMENTS

| | | | |
|---|---|---|---|
| 3,946,189 A | | 3/1976 | Pomella et al. |
| 4,363,948 A | * | 12/1982 | Itoh ............................ 219/69.12 |
| 4,467,166 A | * | 8/1984 | Gamo et al. ................ 219/69.12 |
| 4,703,146 A | * | 10/1987 | Kinoshita .................. 219/69.12 |
| 4,769,520 A | | 9/1988 | Balleys |
| 4,820,894 A | * | 4/1989 | Francois et al. ........... 219/69.12 |
| 5,030,819 A | * | 7/1991 | Borsari ...................... 219/69.12 |
| 6,897,397 B2 | * | 5/2005 | Sato et al. .................. 219/69.12 |

(Continued)

FOREIGN PATENT DOCUMENTS

| | | |
|---|---|---|
| CN | 85202070 U | 3/1986 |
| CN | 1464807 A | 12/2003 |

(Continued)

OTHER PUBLICATIONS

Office Action with English translation dated Apr. 9, 2013 (6 pages).

(Continued)

*Primary Examiner* — Geoffrey S Evans
(74) *Attorney, Agent, or Firm* — Lowe Hauptman & Ham, LLP

(57) ABSTRACT

A wire electrical discharge machine includes an approach control unit. The approach control unit relatively moves a wire electrode with respect to a workpiece while inclining the wire electrode within a plane parallel to the machining surface to which the wire electrode approaches, in an approach section where the wire electrode performs cutting machining on the machining surface of the workpiece.

12 Claims, 8 Drawing Sheets

(56) References Cited

U.S. PATENT DOCUMENTS

| | | | |
|---|---|---|---|
| 7,371,989 B2 * | 5/2008 | Miyajima et al. | 219/69.12 |
| 2004/0011767 A1 | 1/2004 | Hattori et al. | |
| 2004/0178179 A1 | 9/2004 | Ogata et al. | |
| 2008/0251500 A1 * | 10/2008 | Hiraga et al. | 219/69.12 |
| 2010/0187204 A1 * | 7/2010 | Angelella et al. | 219/69.17 |
| 2013/0180866 A1 * | 7/2013 | Baumeler | 219/69.12 |
| 2013/0186865 A1 * | 7/2013 | Yamaoka et al. | 219/69.12 |

FOREIGN PATENT DOCUMENTS

| | | | |
|---|---|---|---|
| CN | 1775442 A | | 5/2006 |
| CN | 101161390 A | | 4/2008 |
| CN | 101791727 A | | 8/2010 |
| CN | 102019473 A | | 4/2011 |
| CN | 103212756 A | | 7/2013 |
| EP | 920945 A2 | * | 6/1999 |
| EP | 2133167 A2 | | 12/2009 |
| EP | 2213400 A1 | | 8/2010 |
| EP | 2295180 A2 | * | 3/2011 |
| EP | 2311594 A2 | | 4/2011 |
| JP | 54-137196 A | * | 10/1979 |
| JP | 61121829 A | | 6/1986 |
| JP | 04-289026 A | * | 10/1992 |
| JP | 542417 A | | 2/1993 |
| JP | 6143037 A | | 5/1994 |
| JP | 3057906 B2 | | 4/2000 |
| JP | 2004276127 A | | 10/2004 |
| JP | 2008-260081 A | | 10/2008 |
| JP | 201099824 A1 | | 5/2010 |
| JP | 2011083866 A | | 4/2011 |
| WO | 03045614 A1 | | 6/2003 |

OTHER PUBLICATIONS

Office Action dated Jul. 2, 2014, corresponds to Chinese patent application No. 201310061938.X.

Extended European Search Report issued Oct. 7, 2014, corresponding to European patent application No. 12195613.0.

* cited by examiner

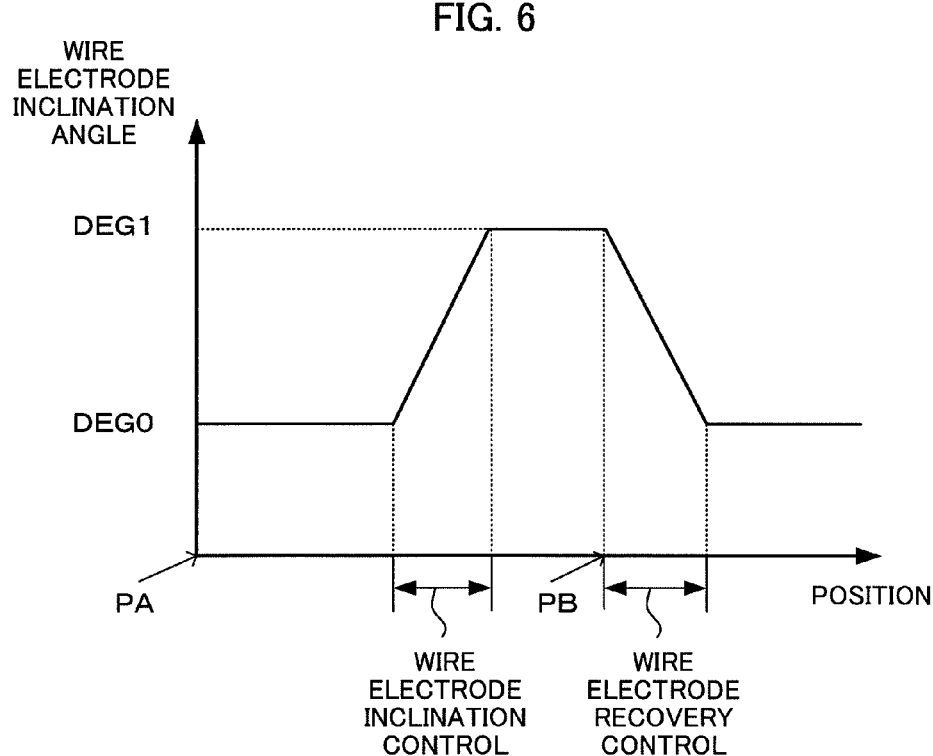
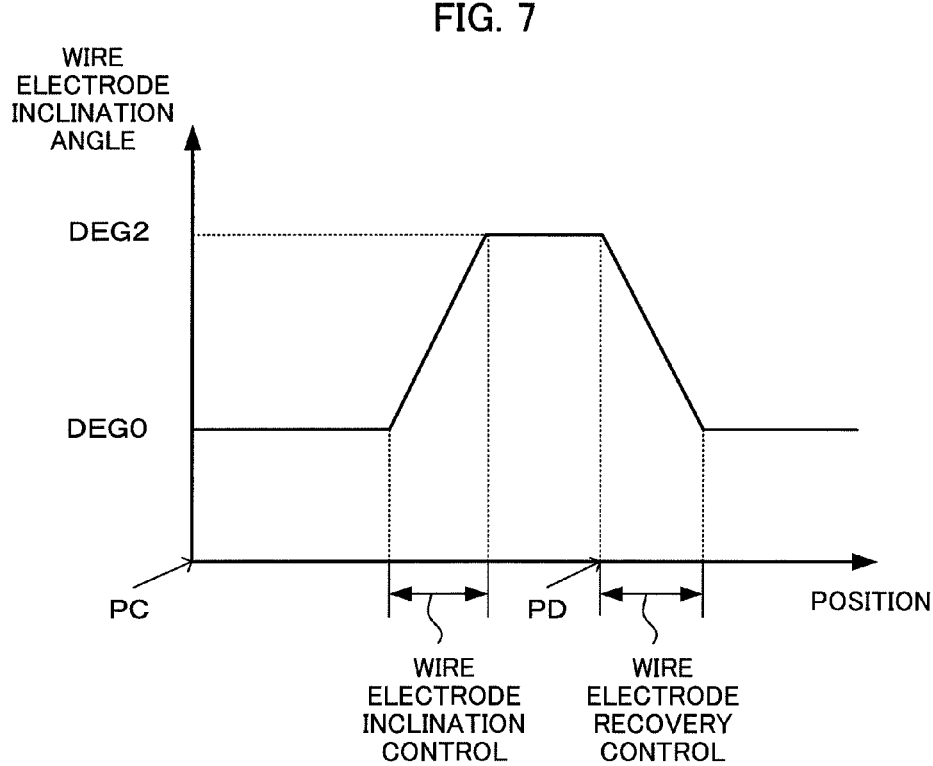

WIRE ELECTRICAL DISCHARGE MACHINE AND WIRE ELECTRICAL DISCHARGE METHOD FOR REDUCING MACHINING DAMAGE DURING CUTTING MACHINING AND ESCAPE MACHINING

RELATED APPLICATIONS

The present application is based on, and claims priority from, Japanese Application Number 2012-040461, filed Feb. 27, 2012, the disclosure of which is hereby incorporated by reference herein in its entirety.

BACKGROUND OF THE INVENTION

1. Field of the Invention

The present invention relates to a wire electrical discharge machine and an electrical discharge method using the wire electrical discharge machine. More particularly, the present invention relates to a wire electrical discharge machine and a wire electrical discharge method for reducing machining damage during cutting machining and escape machining.

2. Description of the Related Art

When performing an electro-discharging machining on a workpiece using a wire electrical discharge machine, it is important to improve machining accuracy of a shape, including an approach portion which corresponds to an end of a section (approach section) where the wire electrode approaches for performing cutting machining on the workpiece. Shapes machined by the wire electro-discharging machining include a punch shape and a die shape, and when these shapes are machined, machining damage as streaks may be caused due to the discharge to the approach portion of the workpiece. This is a phenomenon that occurs as follows. Discharge starts several micrometers before a final arrival position of a position of a command (a command by a move block of the approach portion) for moving the wire electrode of the wire electrical discharge machine, and electro-discharging machining is performed more than necessary before reaching the final position. As a result, machining damage as streaks is caused in the approach portion.

Further, when the wire electrode comes closer to the workpiece machining surface during cutting machining (during approach) and when the wire electrode moves away from the workpiece machining surface during escape machining (during escape process), the approach portion is machined twice (double machining), and this makes such machining damage more conspicuous. Therefore, as the number of cutting processing increases, the machining damage becomes more conspicuous.

In the past, a technique for suppressing the machining damage as streaks has been suggested.

Japanese Patent Application Laid-Open No. 2004-276127 discloses a wire electrical discharge method for generating a program which executes machining of a machining path along a die shape multiple times by changing the cutting position in each machining process. This method is a method for generating a program which executes machining of a machining path along a die shape multiple times by changing the cutting position in each machining, and it takes time to regenerate the program, and this method may sometimes be inapplicable to machining of such a complicated shape as a plurality of approach paths could not be provided thereon.

Japanese Patent Application Laid-Open No. 6-143037 discloses a technique for starting cutting process while inclining a wire electrode in a machining direction and maintaining a predetermined angle with respect to a workpiece, and when the cutting process is carried out for a predetermined distance from the cutting start, an inclination angle of the wire electrode is gradually changed to a specified inclination angle of the machining program, and further, electro-discharging machining is performed along a planned shape. This method is a technique for inclining the wire electrode in a machining direction in order to suppress vibration that occurs in the wire electrode during cutting, and is unable to reduce machining damage during cutting machining and escape machining.

WO 2003/045614 discloses a method for increasing or reducing the machining energy, and generating a shape in proximity to an approach point on a machining surface of a workpiece into a protruding shape or recessed shape in accordance with the purpose of the workpiece with a desired degree. However, this electrical discharge method is to adjust the shape in proximity to an approach point on the machining surface of the workpiece into a desired shape in accordance with the purpose, which does not suppress machining damage in proximity to the approach point.

Japanese Patent Application Laid-Open No. 2011-83866 discloses a technique for performing control for preventing excessive discharge by adjusting machining energy used during escape machining and approach machining during die machining, and suppressing machining damage of a workpiece.

SUMMARY OF THE INVENTION

Accordingly, it is an object of the present invention to provide a wire electrical discharge machine and a wire electrical discharge method for machining a workpiece while inclining a wire electrode within a plane parallel to a machining surface of the workpiece, at least in a section before escape where escape machining is performed or in an approach section where cutting machining is performed on the workpiece, and capable of suppressing machining damage of the workpiece during approach or escape.

The wire electrical discharge machine according to the present invention relatively moves a wire electrode with respect to a workpiece according to a machining program and machines the workpiece by discharge generated between the wire electrode and the workpiece.

A first aspect of a wire electrical discharge machine according to the present invention includes an approach control unit for relatively moving the wire electrode with respect to the workpiece, while inclining the wire electrode within a plane parallel to the machining surface to which the wire electrode approaches, in an approach section where the wire electrode performs cutting machining on a machining surface of the workpiece.

The wire electrical discharge machine may further include a wire electrode inclination angle setting unit for setting an inclination angle of the wire electrode for each cutting processing, and an approach section determination unit for analyzing the machining program and determining whether the wire electrode is located in the approach section or not, wherein, when the approach section determination unit determines that the wire electrode is located in the approach section, the approach control unit inclines the wire electrode based on the inclination angle for each cutting processing which is set by the wire electrode inclination angle setting unit.

The approach control unit may incline the wire electrode according to an inclination command of the wire electrode described in that block of the machining program which corresponds to the approach section.

A second aspect of a wire electrical discharge machine according to the present invention includes an escape control unit for relatively moving the wire electrode with respect to the workpiece while inclining the wire electrode within a plane parallel to the machining surface in which the wire electrode escapes, in a section before an escape section where the wire electrode performs escape machining while escaping from a machining surface of the workpiece.

The wire electrical discharge machine may further include a wire electrode inclination angle setting unit for setting an inclination angle of the wire electrode for each cutting processing, and a section determination unit for analyzing the machining program and determining whether the wire electrode is located in a section before the escape section or not, wherein, when the section determination unit determines that the wire electrode is located in a section before the escape section, the escape control unit inclines the wire electrode based on the inclination angle for each cutting processing which is set by the wire electrode inclination angle setting unit. The escape control unit may incline the wire electrode according to an inclination command of the wire electrode described in a block before that block of the machining program which corresponds to the escape section.

The wire electrical discharge method according to the present invention relatively moves a wire electrode with respect to a workpiece according to a machining program and machines the workpiece by discharge generated between the wire electrode and the workpiece.

A first aspect of a wire electrical discharge method according to the present invention includes relatively moving the wire electrode with respect to the workpiece while inclining the wire electrode within a plane parallel to the machining surface to which the wire electrode approaches, in an approach section where the wire electrode performs cutting machining on a machining surface of the workpiece.

The wire electrical discharge method may further include: setting an inclination angle of the wire electrode for each cutting processing, analyzing the machining program and determining whether the wire electrode is located in the approach section or not; and inclining the wire electrode based on the inclination angle for each cutting processing, when the wire electrode is determined to be located in the approach section.

Inclining the wire electrode in the approach section may include inclining the wire electrode according to an inclination command of the wire electrode described in that block of the machining program which corresponds to the approach section.

A second aspect of a wire electrical discharge method according to the present invention includes relatively moving the wire electrode with respect to the workpiece while inclining the wire electrode within a plane parallel to the machining surface in which the wire electrode escapes, in a section before an escape section where the wire electrode performs escape machining by escaping from a machining surface of the workpiece.

The wire electrical discharge method may further include: setting an inclination angle of the wire electrode for each cutting processing, analyzing the machining program, and determining whether the wire electrode is located in the section before the escape section or not; inclining the wire electrode based on the inclination angle for each cutting processing, when the wire electrode is determined to be located in the section before the escape section.

Inclining the wire electrode in the section before the escape section includes inclining the wire electrode according to an inclination command of the wire electrode described in a block before that block of the machining program which corresponds to the escape section.

The present invention can provide a wire electrical discharge machine and a wire electrical discharge method for machining a workpiece while inclining a wire electrode within a plane parallel to a machining surface of the workpiece, during escape process where escape machining is performed or during approach where cutting machining is performed on the workpiece, and capable of suppressing machining damage of the workpiece during approach or escape.

BRIEF DESCRIPTION OF THE DRAWINGS

The above and the other objects and features of the present invention will become apparent from the following description of embodiments with reference to the attached drawings, in which:

FIG. 6 is a figure for explaining inclination angle control and inclination angle recovery control of the wire electrode during approach;

FIG. 7 is a figure for explaining inclination angle control and inclination angle recovery control of the wire electrode during escape process;

DETAILED DESCRIPTION OF THE PREFERRED EMBODIMENTS

Overview of a wire electrical discharge method according to the present invention will be explained.

In the present invention, according to procedure [1] to [9] explained below, discharge is performed with a wire electrode inclined within a plane parallel to a machining surface of a workpiece, in an escape section where escape machining is performed and an approach section where cutting machining is performed on the workpiece, and thus, cutting damage of the workpiece that occurs in an approach portion and an escape portion is reduced. In this case, the approach portion is a position where the approach section ends, and the escape portion is a position where the escape section starts.

[1] The amount of inclination of the wire electrode during approach process and escape process is set using a program and the like. The amount of inclination of the wire electrode can be set for each time of machining, and any amount of inclination is set in each of the approach section and the escape section.

[2] A determination is made as to whether the approach has started or not.

[3] When the approach is determined to have started in [2], electro-discharging machining of the approach portion is performed with the wire electrode inclined within the plane parallel to the machining surface of the workpiece, on the basis of the amount of inclination set in [1].

[4] A determination is made as to whether a section or a path where approach is performed is terminated or not.

[5] When the approach is determined to have been terminated in [4], the inclination of the wire electrode is terminated.

[6] A determination is made as to whether the escape has started or not.

[7] When the escape is determined to have started in [6], electro-discharging machining of the escape portion is performed with the wire electrode inclined within the plane parallel to the machining surface of the workpiece, on the basis of the amount of inclination set in [1].

[8] A determination is made as to whether a section or a path for escape is terminated or not.

[9] When the escape is determined to have been terminated in [8], the inclination of the wire electrode is terminated.

Figure 1:
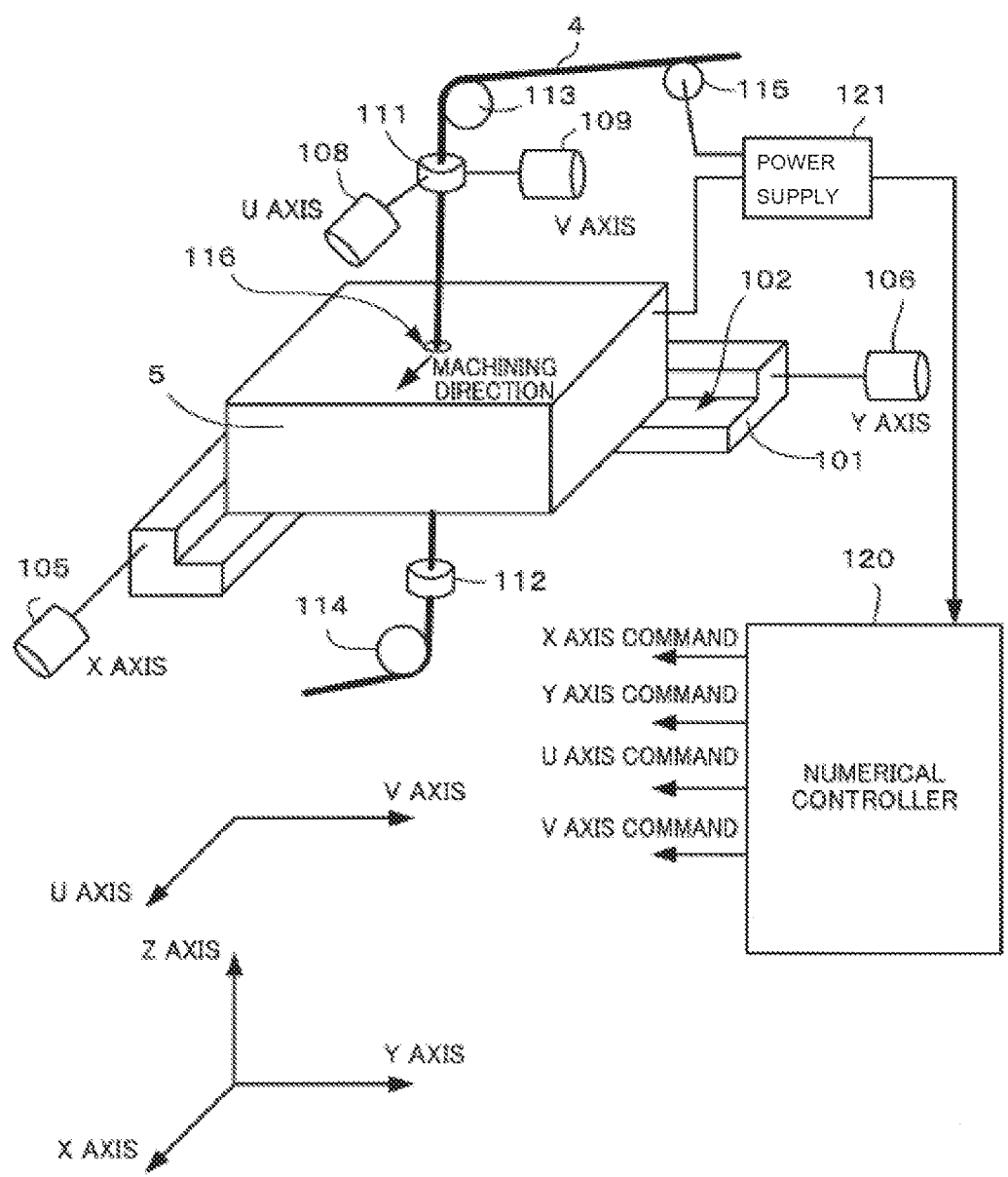
FIG. 1 illustrates a schematic configuration of a wire electrical discharge machine according to the present invention.

A schematic configuration of a wire electrical discharge machine according to the present invention will be explained with reference to FIG. 1.

A workpiece 5, an object to be machined, is arranged and fixed on a workpiece supporting base 101. The workpiece supporting base 101 has a supporting surface 102 having a high degree of flatness. During machining, the bottom surface of the workpiece 5 is arranged and fixed on the workpiece supporting base 101 so as to be in contact with the supporting surface 102.

A wire electrode 4 is fed from a wire electrode feeding reel (not shown) via a power feeding roller 115, an upper guide roller 113, an upper wire guide 111 to a machining location 116 in order to perform electro-discharging machining on the workpiece 5. During machining, with wire connection operation, the wire electrode 4 is put between the upper and lower wire guides 111, 112, a voltage for causing discharge between the wire electrode 4 and the workpiece 5 is applied to the wire electrode 4 put between the upper and lower wire guides 111, 112. The wire electrode 4 passes the machining location 116, and further, passes the lower wire guide 112 and the lower guide roller 114, and is then wound by a winding reel (not shown) that pulls the wire electrode 4 with a predetermined tension. In the machining location 116, a method such as pouring cooling water or impregnating the entire workpiece 5 with working fluid (for example, purified water) is employed. The wire electrode 4 which has finished machining may be collected in a wire collection box (not shown), instead of being wound by the winding reel.

A machining power supply device 121 provides electric energy for electro-discharging machining to the wire electrode 4 via the power feeding roller 115. Accordingly, discharge occurs at a gap (machining gap) between the wire electrode 4 and the workpiece 5, and the workpiece 5 can be subjected to electro-discharging machining. The number of pulses of pulse current or an integral value of pulse current provided by the machining power supply device 121 can be treated as the amount of energy. The machining power supply device 121 outputs a machining speed command to a numerical controller 120.

Usually, the supporting surface 102 of the workpiece supporting base 101 is located in a horizontal direction (a plane parallel to an XY plane). With servo motors 105, 106 of the X axis and the Y axis, the workpiece supporting base 101 can be driven on a plane parallel to the XY plane in which the X axis and the Y axis are perpendicular to each other. With servo motors 108, 109 of a U axis and a V axis, the upper wire guide 111 can be driven in the plane parallel to the XY plane. Usually, the moving direction in the U axis and the moving direction in the X axis are parallel to each other, and the moving direction in the V axis and the moving direction in the Y axis are parallel to each other.

To change the machining location 116, the workpiece 5 and the wire electrode are relatively moved to each other, whereby relative positions of the workpiece 5 and the wire electrode 4 are changed. The relative movement of the wire electrode with respect to the workpiece 5 is performed according to commands (X axis command, Y axis command, U axis command, and V axis command) issued to servo motors of respective axes from the numerical controller 120. The contents of the commands are usually defined by the machining program. The machining program is a program for defining a move command of the wire electrode 4 with respect to the workpiece 5, i.e., a move command to be issued to each of the servo motors of respective axes, and is defined on the plane parallel to the XY plane. The plane where the machining program is defined can be set at any position in the Z axis direction. The plane that can be set at any position will be referred to as a program plane.

Subsequently, the wire electrical discharge method for reducing machining damage during cutting machining and escape machining, according to the present invention, will be explained.

Figure 2:
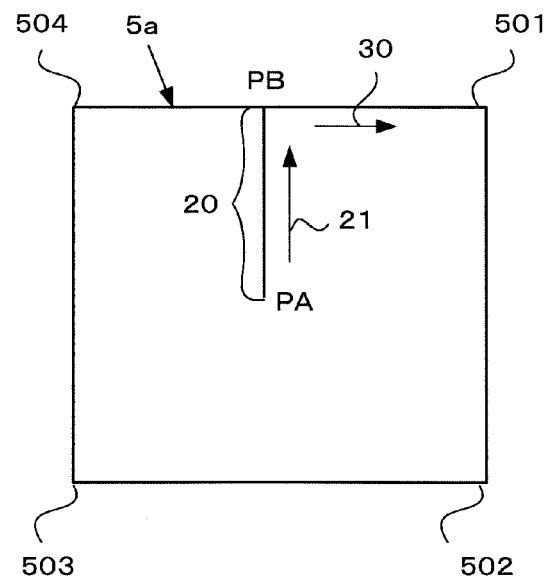
FIG. 2 is a figure for explaining approach of a wire electrode as shown in FIG. 1 to a workpiece.

FIG. 2 illustrates the workpiece as viewed from above, explaining approach of the wire electrode 4 to the workpiece. FIG. 2 shows an example of machining in which the workpiece 5a is machined as a die having a cross section of a rectangular shape having apexes 501, 502, 503, 504.

Reference numeral 20 of FIG. 2 denotes an approach section, and reference numeral 21 denotes a machining direction during approach process. Reference symbol PA of FIG. 2 denotes an approach start position, and reference symbol PB denotes an approach end position. In a section of approach from PA to PB, a machining path in which the wire electrode 4 relatively moves with respect to the workpiece 5a is indicated by reference numeral 20 set by the machining program (NC program).

Figure 3:
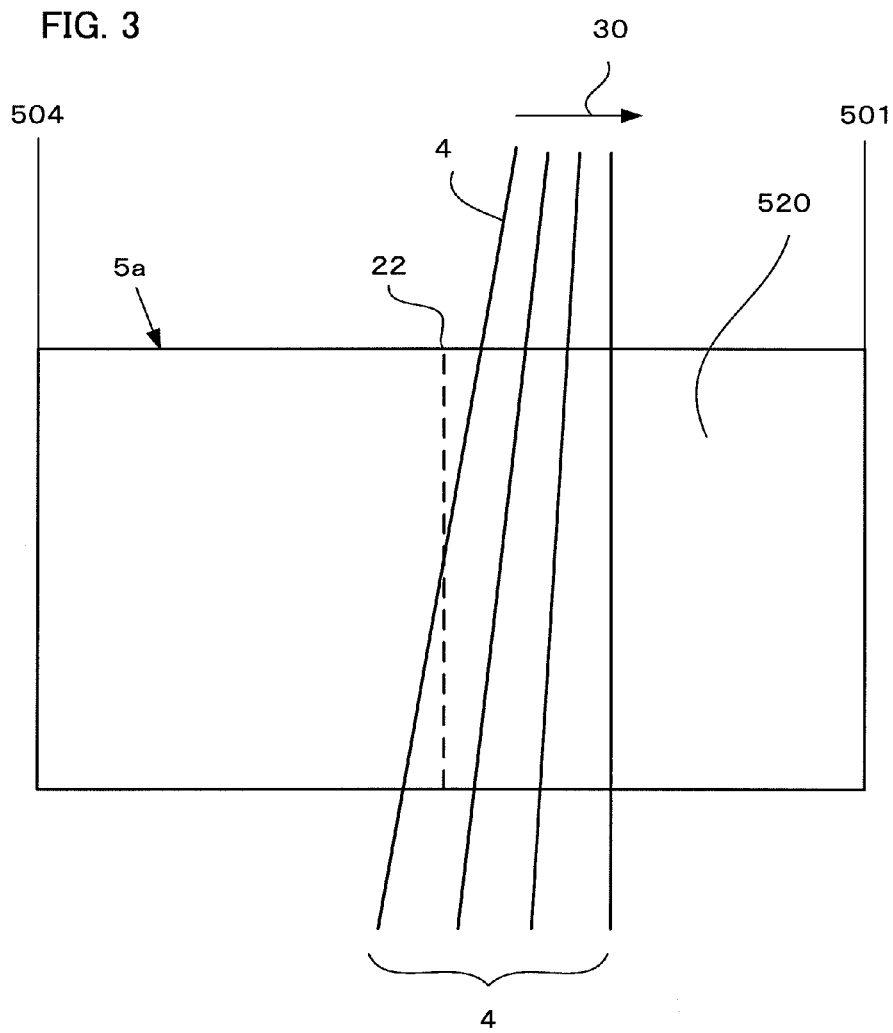
FIG. 3 is a figure for explaining that the wire electrode as shown in FIG. 1 is inclined and caused to approach the workpiece, and after the approach, the inclination of the wire electrode is gradually returned back to the original inclination.

FIG. 3 is a figure for explaining that the wire electrode 4 is inclined and caused to approach the workpiece 5a, and after the approach, the inclination of the wire electrode 4 is gradually returned back to the original inclination.

In the approach section 20, the wire electrode 4 is inclined within a plane parallel to a machining surface 520 of the workpiece 5a. The inclination angle may be set at any degree. Usually, about one degree is set. After the wire electrode 4 passes the approach section 20, the wire electrode 4 performs electro-discharging machining on the machining surface 520 of the workpiece 5a in such a manner that the inclination angle of the wire electrode 4 is gradually returned back to the original angle of the standard straight machining while moving in a direction indicated by reference symbol 30.

Figure 4:
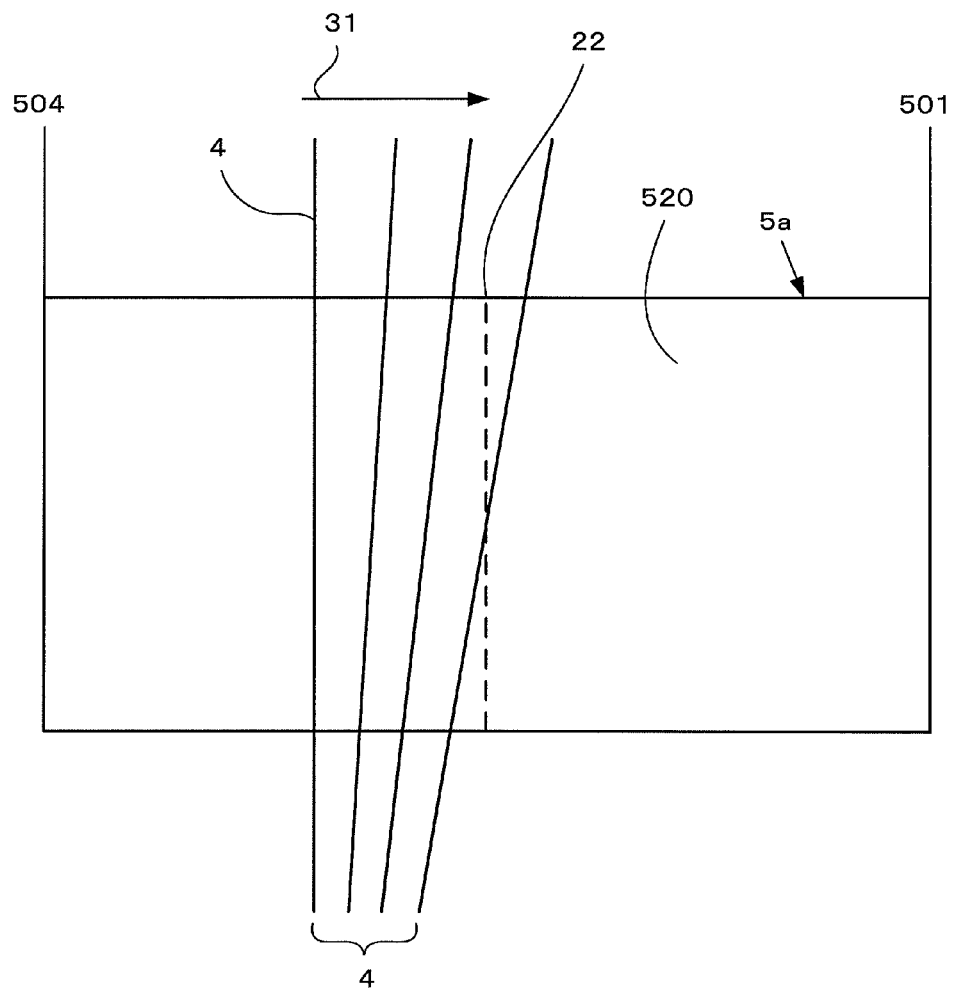
FIG. 4 is a figure for explaining that machining is performed by gradually inclining the wire electrode in a section before escape.
Figure 5:
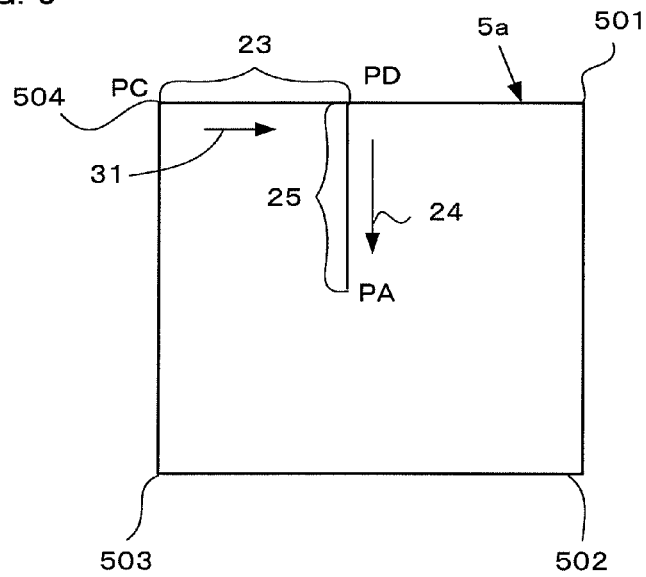
FIG. 5 is a figure for explaining escape of the wire electrode from the workpiece.
Figure 8:
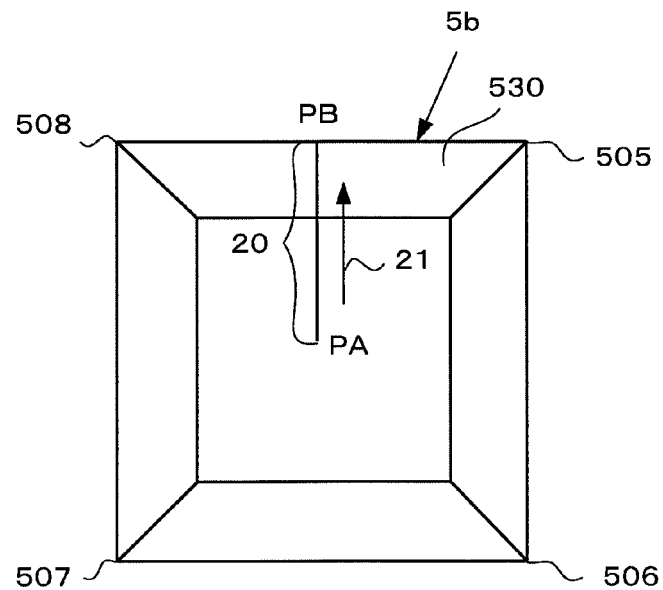
FIG. 8 is a figure for explaining approach of the wire electrode to the workpiece when machining an inclined tapered surface.

FIG. 4 is a figure for explaining that machining is performed upon gradually inclining the wire electrode 4 in a section before escape. FIG. 5 is a figure for explaining escape of the wire electrode 4 from the workpiece. PC denotes a machining start position in a section before the escape section, and corresponds to the position of apex 504 in FIG. 4. PD denotes a machining end position in a section before the escape section. Accordingly, the section from PC to PD represents a section 23 before the escape section.

When the electro-discharging machining is performed on the machining surface 520 of the workpiece 5a, and the section 23 before the escape section (i.e., the section from PC to PD) is processed, the wire electrode 4 is inclined within the plane parallel to the machining surface 520 of the workpiece 5a. The inclination angle may be set at any degree. Usually, about one degree is set. The wire electrode 4 passes the section 23 (section from PC to PD) before the escape section, and the inclination angle of the wire electrode 4 is gradually returned back to the original angle of the standard straight machining while moving in a machining direction 24 in the escape section 25.

By performing the machining as described above, double machining on the same position during approach process and during escape process can be avoided, and therefore, machining damage can be reduced.

It is not necessary to incline the electrode 4 in both of approach process and escape process. Alternatively, the wire electrode 4 is inclined during approach process, and thereafter, the inclination angle is returned back to the angle of the standard straight machining, and the escape may be made with that angle. During approach process, the angle of the wire electrode 4 may be set at the angle of the standard straight machining, and the wire electrode 4 may be inclined during escape process.

FIG. 6 is a figure for explaining inclination angle control and inclination angle recovery control of the wire electrode during approach process.

PA, PB as shown in FIG. 6 are the same as positions PA, PB, respectively, as shown in FIG. 2. After the wire electrode 4 passes the position PA, the wire electrode 4 is inclined within the plane parallel to the machining surface 520 of the workpiece 5a from an inclination angle DEG0 of the wire electrode during standard straight machining (hereinafter referred to as "inclination angle DEG0") to a specified inclination angle DEG1 for approach (hereinafter referred to as "specified inclination angle DEG1") according to wire electrode inclination angle control. After the inclination of the wire electrode, the machining is performed to the position PB at which the approach section 20, set by the machining program (NC program) and the like, is terminated while the wire electrode 4 is inclined at the specified inclination angle DEG1.

When the wire electrode 4 is determined to have passed the position PB, the inclination of the wire electrode is terminated according to the wire electrode inclination angle recovery control, and the inclination angle of the wire electrode 4 is returned back to the original state (i.e., to the inclination angle DEG0). The specified inclination angle DEG1 of the wire electrode 4 may be a positive value or a negative value. For example, when the specified inclination angle DEG1 is a positive value, the wire electrode 4 is inclined as shown in FIG. 3, and on the other hand, when the inclination angle DEG0 is a negative value, the wire electrode 4 is inclined to the opposite side. More specifically, the wire electrode 4 is inclined such that the upper side of the wire electrode 4 is located at the left side of an inclination position 22 of the wire electrode, in a sheet paper of FIG. 4, during standard straight machining.

FIG. 7 is a figure for explaining inclination angle control and inclination angle recovery control of the wire electrode during escape process.

PC, PD as shown in FIG. 7 are the same as the positions PC, PD, respectively, in FIG. 5. After the wire electrode 4 passes the position PC, the wire electrode 4 is inclined within the plane parallel to the machining surface 520 of the workpiece 5a to a specified inclination angle DEG2 of the wire electrode for escape (hereinafter referred to as "specified inclination angle DEG2") according to wire electrode inclination angle control. After the inclination of the wire electrode 4, the machining is performed to the position PD at which the section 23 before the escape section set by the machining program (NC program) and the like is terminated while the wire electrode 4 is inclined at the specified inclination angle DEG2.

When the wire electrode 4 is determined to have passed the position PD, the inclination of the wire electrode 4 is terminated according to the wire electrode inclination angle recovery control, and the inclination angle of the wire electrode 4 is returned back to the original state (i.e., to the inclination angle DEG0). Like the specified inclination angle DEG1, the specified inclination angle DEG2 of the wire electrode 4 may be a positive value or a negative value.

Instead of determining the approach section 20 and the escape section 25 based on a block of the program and causing the wire electrode 4 to be inclined on the basis of the determination result, an inclination command for inclining the wire electrode 4 may be described in a block corresponding to the section 23 before the block corresponding to the escape section 25 and the block corresponding to the approach section 20 of the machining program (NC program), and the wire electrode 4 may be inclined by executing the block. The number of cutting processing can be determined by means of a parameter for setting the number of cutting processing which satisfies a machining condition. The inclination angle of the wire electrode 4 during cutting machining and escape machining may be stored to a memory of the numerical controller 120 of the wire electrical discharge machine for each cutting processing (function of a wire electrode inclination angle setting unit in the wire electrical discharge machine).

Subsequently, a case where a workpiece 5b is machined as a die of which machining surface is not vertical and which has an inclined tapered surface will be explained. Like machining of the workpiece 5a explained with reference to FIGS. 2 to 7, control is performed to reduce machining damage during cutting machining and escape machining.

Figure 9:
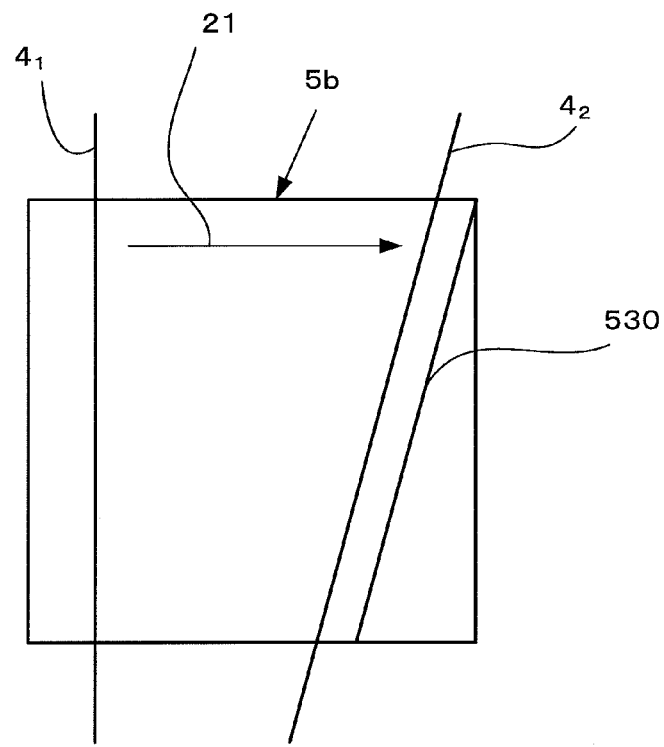
FIG. 9 illustrates the wire electrode of FIG. 8, as viewed laterally with respect to a direction in which the wire electrode moves.
Figure 10:
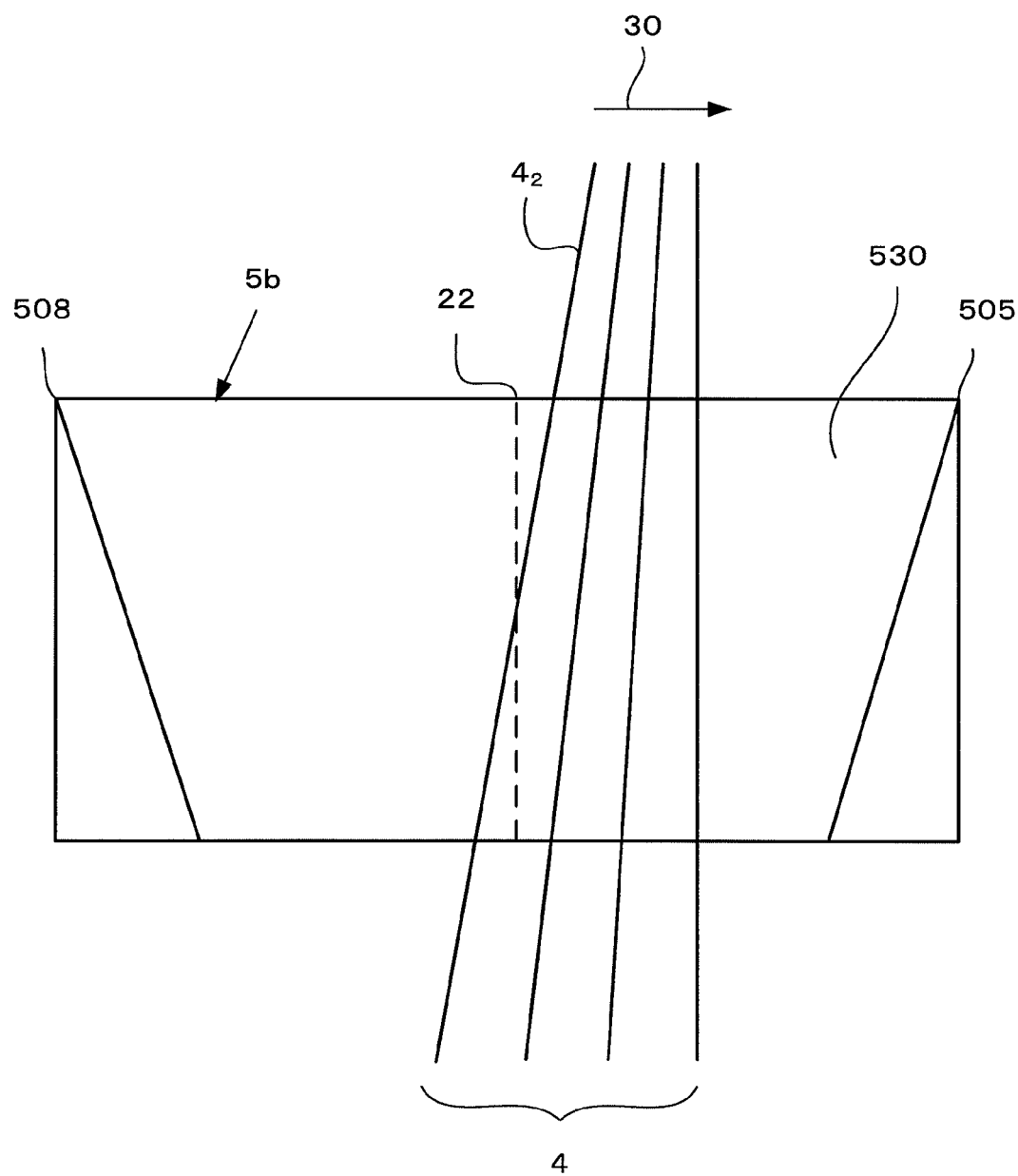
FIG. 10 is a figure for explaining that the wire electrode is inclined and caused to approach the workpiece, and after the approach, the inclination of the wire electrode is gradually returned back to the original inclination.
Figure 11:
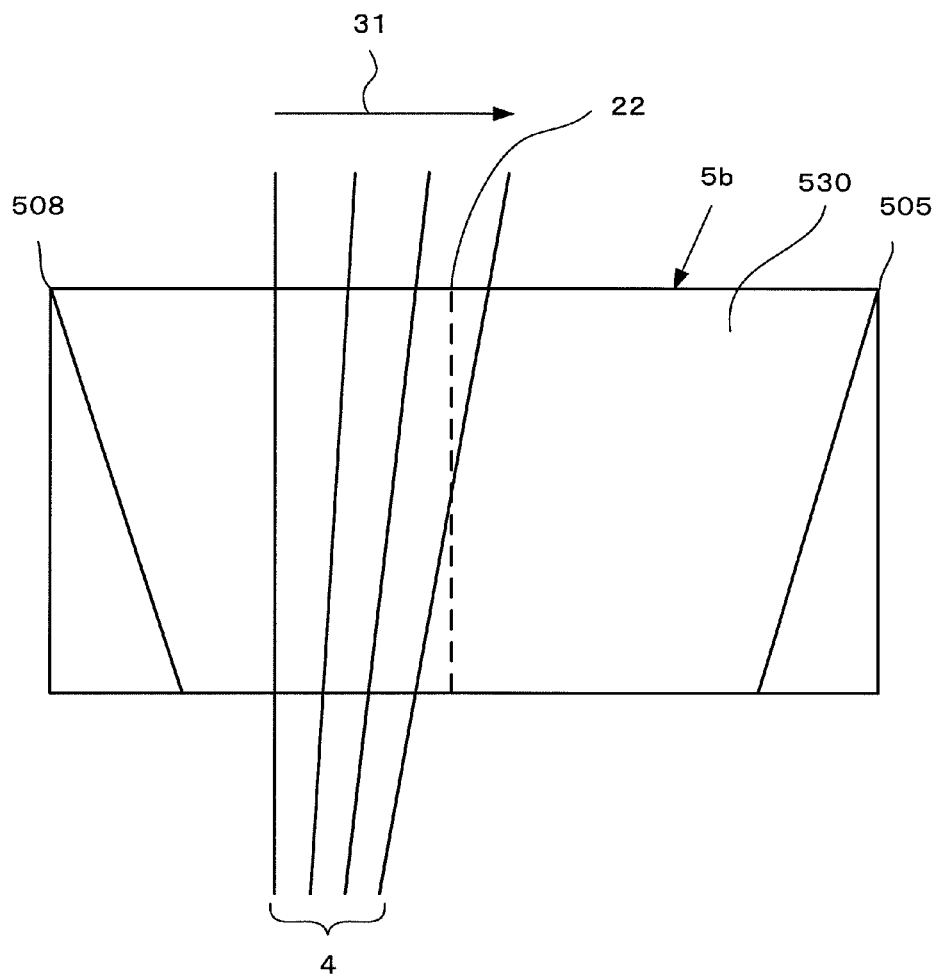
FIG. 11 is a figure for explaining that machining is performed upon gradually inclining the wire electrode in a section before escape.
Figure 12:
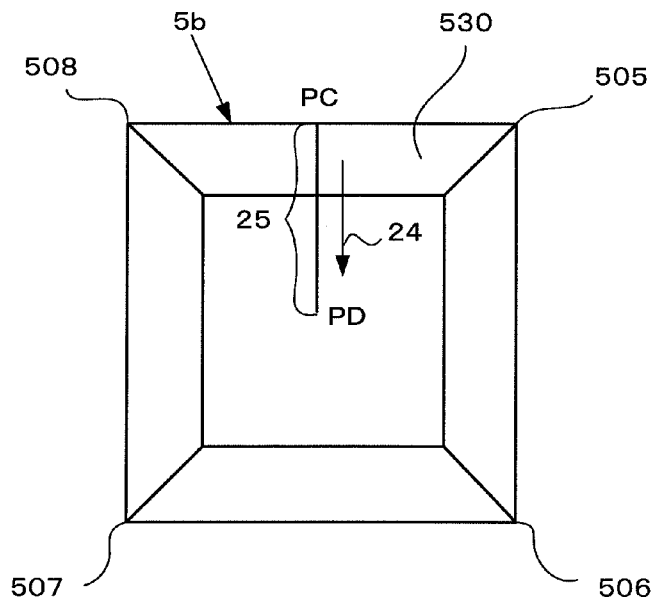
FIG. 12 is a figure for explaining escape of the wire electrode from the workpiece.

FIGS. 8 to 12 are figures for explaining approach of the wire electrode to the workpiece in a case where the surface of the workpiece to be machined is not vertical but an inclined tapered surface. FIG. 9 is a figure illustrating the wire electrode 4 of FIG. 8, as viewed laterally with respect to a direction in which the wire electrode 4 moves. FIG. 10 is a figure for explaining that the wire electrode is inclined and caused to approach the workpiece, and after the approach, the inclination of the wire electrode is gradually returned back to the original inclination. FIG. 11 is a figure for explaining that machining is performed by gradually inclining the wire electrode in a section before escape. FIG. 12 is a figure for explaining escape of the wire electrode from the workpiece.

Even if a machining surface 530 of the workpiece 5b has a inclined tapered surface, the wire electrode 4 is inclined in the approach section 20 to the specified inclination angle DEG1 within a plane parallel to the machining surface 530 of the workpiece 5b (see FIG. 9), and after passing the approach section 20, the inclination of the wire electrode 4 is terminated, and the inclination angle of the wire electrode 4 is returned back to the state during the standard straight machining (to inclination angle DEG0). Then, control is performed such that, in the section 23 before the escape section, the wire electrode 4 is inclined to the specified inclination angle DEG2 within the plane parallel to the machining surface 530 of the workpiece 5b, and after passing the section 23 before the escape section, the inclination angle of the wire electrode 4 is returned back to the state at the time of standard straight machining (to inclination angle DEG0).

The inclination angle DEG1 of the wire electrode to be inclined in the approach section 20 is made different from the inclination angle DEG2 of the wire electrode to be inclined in the section 23 before the escape section so that no machining damage is caused in the approach portion as a result of double machining on the approach portion during approach process and escape process.

Figure 13:
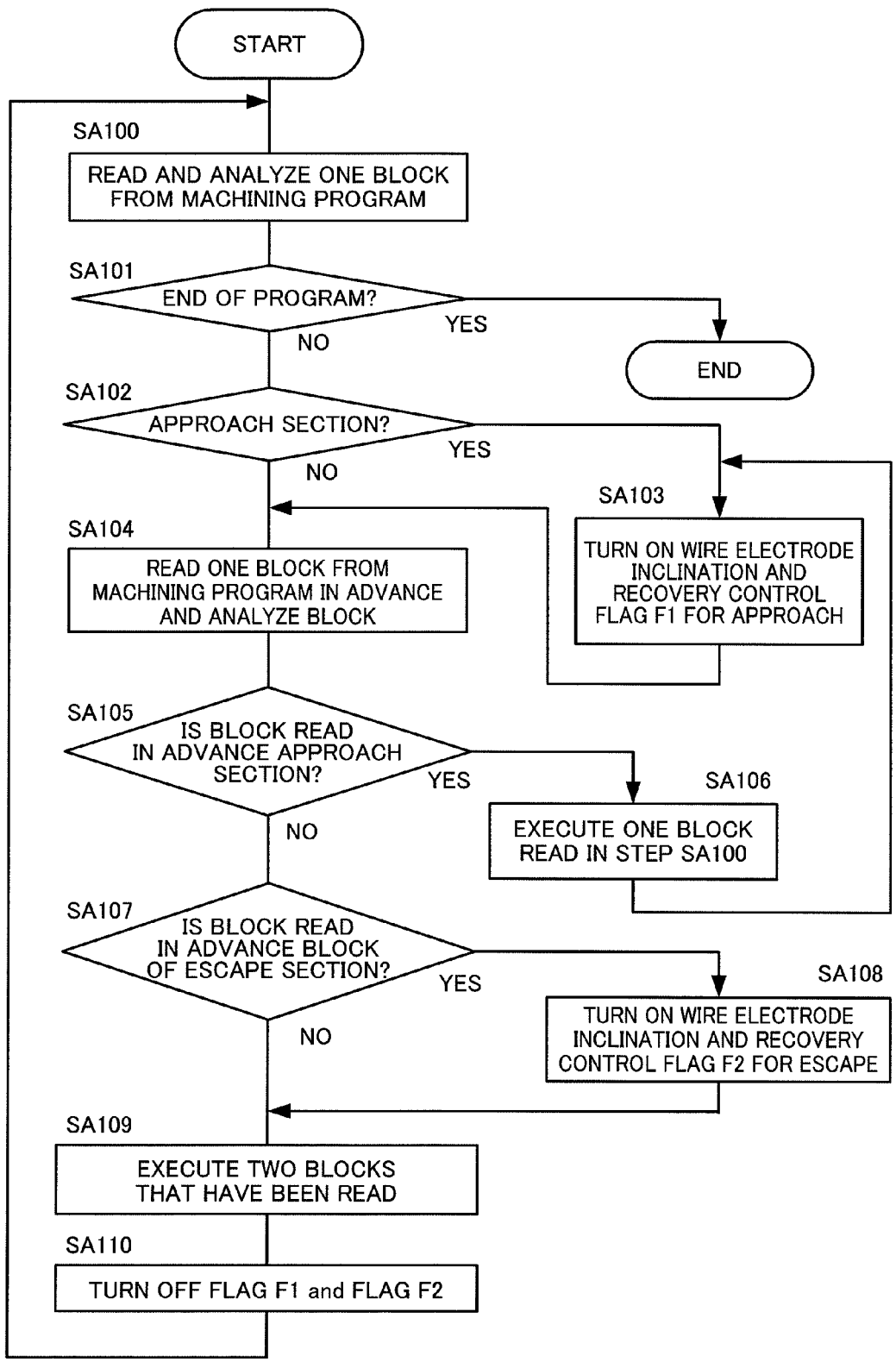
FIG. 13 is a flowchart for explaining machining for executing control for reducing machining damage during cutting machining and escape machining.

The processing for executing a control for reducing a machining damage during cutting machining and escape machining will be explained with reference to the flowchart of FIG. 13. Hereinafter, explanation will be made in accordance with each step. As an initial setting, flags F1 and F2 are at OFF state.

[Step SA100] One block is read from the machining program, and the read block is analyzed.

[Step SA101] A determination is made as to whether the block read in step SA100 is a block that represents an end of the program. When the block is determined to be the block representing the end of the program (YES), this processing is terminated. When the block is determined to be the block not representing the end of the program (NO), the processing proceeds to step SA102.

[Step SA102] A determination is made as to whether the read block is a block that represents an approach section. When the block is determined to be a block representing an approach section (YES), the processing proceeds to step SA103. When the block is determined not to be a block representing an approach section (NO), the processing proceeds to step SA104.

[Step SA103] The wire electrode inclination and recovery control flag F1 during approach is turned ON, and step SA104 is subsequently performed.

[Step SA104] One block is read in advance from the machining program, and the block read in advance is analyzed.

[Step SA105] A determination is made as to whether the block read in advance is of an approach section or not. When the block is determined to be that of approach section (YES), processing proceeds to step SA106. When the block is determined not to be that of approach section (NO), processing proceeds to step SA107.

[Step SA106] One block read in step SA100 is executed, and processing proceeds to step SA103.

[Step SA107] A determination is made as to whether the block read in advance is a block in an escape section. When the block is determined to be a block in an escape section (YES), processing proceeds to step SA108. When the block is determined not to be a block in an escape section (NO), processing proceeds to step SA109.

[Step SA108] The wire electrode inclination and recovery control flag F2 during escape process is turned ON, and processing proceeds to step SA109.

[Step SA109] The read two blocks are executed.

[Step SA110] One of the wire electrode inclination and inclination recovery control flags F1, F2, whichever is in ON state during approach process and escape process, is turned OFF, and processing proceeds to step SA100, and this processing is continued.

In this case, the above flowchart will be explained supplementarily.

In step SA102 where the determination as to whether the block is the approach section or not is made, the block may be determined to be an approach section if a G code of G41 (offset-left) or G42 (offset-right) is described in the read block. Also, in step SA107 where the determination as to whether the block is the escape section or not is made, the block may be determined to be an escape section if a G code of G40 (offset cancel) is described in the block read in advance.

Subsequently, step SA109 will be explained supplementarily.

When the block describing G41 or G42 is read in step SA100, the block is determined (YES) to be an approach section in step SA102 after step SA101, and the wire electrode inclination and recovery control flag F1 is turned ON in step SA103, and one block is read in advance from the machining program in step SA104. When the block read in advance is not the section of an escape (i.e., determination result is NO), processing proceeds to step SA107.

In step SA109, the wire electrode inclination and recovery control flag F1 is in the ON state. Accordingly, as shown in FIG. 6, control is performed to incline the wire electrode 4 to a specified angle within the approach section, and control is performed to recover the wire electrode 4 back to the inclination angle of the wire electrode at the time of standard straight machining in a section continuous to the approach section (section commanded by the block read in advance in step SA104). The control of the inclination of the wire electrode 4 within the approach section is performed such that an inclination angle of the wire electrode 4 becomes a preset angle at the end position of the approach section. The control for recovering the wire electrode 4 back to the inclination angle of the wire electrode 4 at the time of standard straight machining in a section subsequent to the approach section is performed such that the recovery of the inclination angle is finished within the section. The wire electrode inclination and the recovery control are executed together with the electro-discharging machining commanded by the read block.

When a block in which neither G41 nor G42 is described is read in step SA100, and when the read block is neither block of program termination nor block of an approach section, one block is read in advance from the machining program in step SA104 after steps SA101 and SA102.

When the block read in advance in step SA104 is determined to be a block of an approach section in which G41 and G42 are included (YES), one block read in step SA100 is executed in step SA106 based on determination of step SA105, and processing proceeds to step SA103. When the block read in advance in step SA104 is determined to a block which corresponds to an approach section, the wire electrode inclination and recovery control flag F1 is turned ON in step SA103. This is done in order to perform inclination and inclination recovery control during cutting machining for the block read in step SA104 and a block subsequent thereto.

On the other hand, when the block read in advance in step SA104 is determined not to be a block of an approach section, a determination is made as to whether the block read in advance is a section of escape or not in step SA107 after the determination of step SA105. When G40 (offset cancel) is described in the block read in advance, the block read in advance is determined to be a block of an escape section.

When the block read in advance in step SA104 is determined not to be a block of an escape section, the wire electrode inclination and recovery control flag F1 is in an OFF state. Accordingly, two blocks read in steps SA100 and SA104 are executed in step SA109, without controls of inclination or inclination recovery of the wire electrode being performed.

On the other hand, when the block read in advance in step SA104 is a block in which G40 is described so that the block is determined to be an escape section in step SA107, the wire electrode inclination and recovery control flag F2 is turned ON in step SA108. In step SA109, the wire electrode inclination and recovery control flag F2 for escape is in the ON state. Accordingly, as shown in FIG. 7, control is performed to incline the wire electrode 4 to a specified angle within the section before the escape section, and control is performed to recover the wire electrode 4 back to the inclination angle of the wire electrode at the time of standard straight machining in a section continuous to the section before the escape section, i.e., in an escape section (section commanded by the block read in advance in step SA104). The control of the inclination of the wire electrode 4 within the section before the escape section is performed such that an inclination angle of the wire electrode 4 becomes a preset angle at the end position of the section before the escape section. The control for recovering the wire electrode 4 back to the inclination angle of the wire electrode 4 at the time of standard straight machining in an escape section is performed such that recovery of the inclination angle is finished within the section. The wire electrode inclination and the recovery control are executed together with the electro-discharging machining commanded by the read block.

The invention claimed is:

1. A wire electrical discharge machine for machining a workpiece, the wire electrical discharge machine comprising:
    at least one wire guide configured to move a wire electrode with respect to the workpiece to machine the workpiece by discharge generated between the wire electrode and the workpiece; and
    a numerical controller configured to cause the wire guide to relatively move the wire electrode with respect to the workpiece while inclining the wire electrode within a plane parallel to a machining surface to which the wire electrode approaches in an approach section, wherein
    the wire electrode performs cutting machining on the machining surface of the workpiece, and
    after the approach section, the numerical controller is configured to cause the wire guide to gradually reduce an inclination of the wire electrode within the plane parallel to the machining surface for performing machining on the machining surface.

2. The wire electrical discharge machine according to claim 1, wherein the numerical controller is configured to
    set an inclination angle of the wire electrode for each cutting processing; and
    analyze a machining program and determine whether the wire electrode is located in the approach section or not,
    wherein
    when the numerical controller determines that the wire electrode is located in the approach section, the numerical controller is configured to cause the wire guide to incline the wire electrode based on the inclination angle for each cutting processing.

3. The wire electrical discharge machine according to claim 1, wherein the numerical controller is configured to cause the wire guide to incline the wire electrode according to an inclination command of the wire electrode described in a block of a machining program which corresponds to the approach section.

4. A wire electrical discharge machine for machining a workpiece, the wire electrical discharge machine comprising:
    at least one wire guide configured to move a wire electrode with respect to the workpiece to machine the workpiece by discharge generated between the wire electrode and the workpiece; and
    a numerical controller configured to cause the wire guide to relatively move the wire electrode with respect to the workpiece while inclining the wire electrode within a plane parallel to a machining surface, in which the wire electrode performs machining, in a section before an escape section where the wire electrode performs escape machining while escaping from the machining surface of the workpiece,
    wherein the numerical controller is configured to cause the wire guide to gradually reduce an inclination of the wire electrode within the plane parallel to the machining surface while moving the wire electrode in the escape section.

5. The wire electrical discharge machine according to claim 4, wherein the numerical controller is configured to
    set an inclination angle of the wire electrode for each cutting processing, and
    analyze a machining program and determine whether the wire electrode is located in a section before the escape section or not,
    wherein
    when the numerical controller determines that the wire electrode is located in a section before the escape section, the numerical controller is configured to cause the wire guide to incline the wire electrode based on the inclination angle for each cutting processing.

6. The wire electrical discharge machine according to claim 4, wherein the numerical controller is configured to cause the wire guide to incline the wire electrode according to an inclination command of the wire electrode described in a block before a block of a machining program which corresponds to the escape section.

7. A wire electrical discharge method for relatively moving a wire electrode with respect to a workpiece according to a machining program and machining the workpiece by discharge generated between the wire electrode and the workpiece, the wire electrical discharge method comprising:
    relatively moving the wire electrode with respect to the workpiece while inclining the wire electrode within a plane parallel to a machining surface to which the wire electrode approaches in an approach section,
    wherein
    the wire electrode performs cutting machining on the machining surface of the workpiece, and
    after the approach section, an inclination of the wire electrode is gradually reduced within the plane parallel to the machining surface to perform machining on the machining surface.

8. The wire electrical discharge method according to claim 7, further comprising:
    setting an inclination angle of the wire electrode for each cutting processing, analyzing the machining program and determining whether the wire electrode is located in the approach section or not; and
    inclining the wire electrode based on the inclination angle for each cutting processing, when the wire electrode is determined to be located in the approach section.

9. The wire electrical discharge method according to claim 7, wherein inclining the wire electrode in the approach section includes inclining the wire electrode according to an inclination command of the wire electrode described in a block of the machining program which corresponds to the approach section.

10. A wire electrical discharge method for relatively moving a wire electrode with respect to a workpiece according to a machining program and machining the workpiece by discharge generated between the wire electrode and the workpiece, the wire electrical discharge method comprising:

relatively moving the wire electrode with respect to the workpiece while inclining the wire electrode within a plane parallel to a machining surface in which the wire electrode performs machining, in a section before an escape section where the wire electrode performs escape machining by escaping from the machining surface of the workpiece, wherein an inclination of the wire electrode is gradually reduced within the plane parallel to the machining surface while moving the wire electrode in the escape section.

11. The wire electrical discharge method according to claim 10, further comprising:

setting an inclination angle of the wire electrode for each cutting processing, analyzing the machining program, and determining whether the wire electrode is located in the section before the escape section or not;

inclining the wire electrode based on the inclination angle for each cutting processing, when the wire electrode is determined to be located in the section before the escape section.

12. The wire electrical discharge method according to claim 10, wherein inclining the wire electrode in the section before the escape section includes inclining the wire electrode according to an inclination command of the wire electrode described in a block before a block of the machining program which corresponds to the escape section.

* * * * *